United States Patent
Sanzone (10) Patent No.: US 6,997,418 B1
(45) Date of Patent: Feb. 14, 2006

(54) METHODS AND APPARATUS FOR TESTING A TRAIN CONTROL SYSTEM

(75) Inventor: Frank Sanzone, Satellite Beach, FL (US)

(73) Assignee: GE-Harris Raliway Electronics, L.L.C., Melbourbe, FL (US)

( * ) Notice: Subject to any disclaimer, the term of this patent is extended or adjusted under 35 U.S.C. 154(b) by 0 days.

(21) Appl. No.: 09/625,366

(22) Filed: Jul. 26, 2000

Related U.S. Application Data (63) Continuation-in-part of application No. 09/187,456, filed on Nov. 5, 1998.

(60) Provisional application No. 60/064,527, filed on Nov. 5, 1997.

(51) Int. Cl.
  B61L 3/00    (2006.01)
  H04B 17/02   (2006.01)
  H04B 7/15    (2006.01)

(52) U.S. Cl. .................... 246/167 R; 455/9; 455/11.1

(58) Field of Classification Search ............ 455/9, 455/11.1, 14, 16, 66, 67.1, 67.4, 226.1, 423, 455/13.1, 13.4, 68, 69, 67.11, 67.14, 426.1; 246/167 R, 187 A, 187 C, 187 R; 303/3, 303/7, 15, 16, 17, 20, 128; 73/121; 701/20, 701/29, 33, 7, 19
See application file for complete search history.

(56) References Cited

U.S. PATENT DOCUMENTS

| | | | |
|---|---|---|---|
| 3,963,201 A | 6/1976 | Brumberger et al. | |
| 4,029,274 A | 6/1977 | Sibley | |
| 4,208,717 A | 6/1980 | Rush | |
| 4,302,811 A | 11/1981 | McElhenny | |
| 4,687,258 A * | 8/1987 | Astley | |
| 4,774,669 A | 9/1988 | Schmitz et al. | |
| 4,777,652 A * | 10/1988 | Stolarczyk | 455/3.03 |
| 4,853,883 A | 8/1989 | Nickles et al. | |
| 5,039,038 A * | 8/1991 | Nichols et al. | 246/167 R |
| 5,340,062 A | 8/1994 | Heggestad | |
| 5,358,202 A * | 10/1994 | Tse et al. | |
| 5,420,883 A | 5/1995 | Swensen et al. | |
| 5,432,838 A * | 7/1995 | Purchase et al. | 455/523 |
| 5,452,870 A | 9/1995 | Heggestad | |
| 5,681,015 A * | 10/1997 | Kull | 246/167 R |
| 5,720,455 A * | 2/1998 | Kull et al. | 246/187 |
| 5,744,707 A | 4/1998 | Kull | |
| 5,774,789 A * | 6/1998 | van der Kaay et al. | 455/16 |
| 5,787,371 A * | 7/1998 | Balukin et al. | 701/19 |
| 5,817,934 A * | 10/1998 | Skantar | 73/121 |
| 5,833,325 A | 11/1998 | Hart | |
| 5,873,638 A | 2/1999 | Bezos | |
| 5,927,822 A | 7/1999 | Hart | |
| 6,041,216 A * | 3/2000 | Rose et al. | 455/9 |
| 6,095,618 A * | 8/2000 | Heneka et al. | 303/3 |
| 6,102,491 A | 8/2000 | Bezos | |

(Continued)

Primary Examiner—Curtis Kuntz
Assistant Examiner—Barry W Taylor
(74) Attorney, Agent, or Firm—Armstrong Teasdale LLP (57) ABSTRACT

A method is described for testing a train control system configured to control at least two locomotives. The train control system includes a control unit on each locomotive and is configured to control the locomotives using communication links between the control units. The method includes establishing communication between a testing device and a first locomotive control unit, and emulating a second locomotive control unit using the testing device. The testing method allows control system testing to be performed using a hand-held testing device in place of a second locomotive and facilitates testing of repeaters.

32 Claims, 3 Drawing Sheets

U.S. PATENT DOCUMENTS

| | | |
|---|---|---|
| 6,108,524 A * | 8/2000 | Hershey et al. ............ 455/67.1 |
| 6,126,247 A | 10/2000 | Paul et al. |
| 6,151,480 A * | 11/2000 | Fischer et al. .............. 340/310 |
| 6,196,640 B1 | 3/2001 | Stender |
| 6,229,452 B1 | 5/2001 | Kull |
| 6,270,040 B1 * | 8/2001 | Katzer ......................... 201/19 |
| 6,275,165 B1 * | 8/2001 | Bezos ................... 246/182 R |
| 6,400,281 B1 * | 6/2002 | Darby et al. ............ 246/167 R |
| 6,401,015 B1 * | 6/2002 | Stewart et al. ................. 303/7 |
| 6,435,624 B1 * | 8/2002 | Kull et al. .................... 303/15 |

* cited by examiner

METHODS AND APPARATUS FOR TESTING A TRAIN CONTROL SYSTEM

CROSS REFERENCE TO RELATED APPLICATIONS

This application is a continuation in part of U.S. application Ser. No. 09/187,456 filed Nov. 5, 1998, which claims the benefit of U.S. provisional application Ser. No. 60/064,527 filed Nov. 5, 1997.

BACKGROUND OF THE INVENTION

This invention relates generally to train controls and, more particularly, to testing of train controls.

It is common to power a train using a lead locomotive and several remote locomotives distributed along the train length. Because such trains often are a mile or more in length, train control systems are known which provide for remote control of locomotive power and braking. One such distributed power control system provides control of remote locomotives via command signals sensed at the lead locomotive and transmitted over a radio link to the remote locomotives. Message repeaters also typically are used to reinforce command signals in problematic communication areas such as tunnels. Such a system allows control of locomotive tractive effort, dynamic braking and air brakes to be optimized over the length of the train.

To provide for distributed power control using such a system, the train operator typically sets up a remote communication unit in each remote locomotive and a lead communication unit in the lead locomotive. The operator then establishes communication links between the lead unit and each of the remote units. After the control system has been set up, control system equipment at one locomotive is tested by using another locomotive having equipment linked to the system. Using a second locomotive can make locomotive and repeater equipment testing a cumbersome process.

It would be desirable to verify that a control system is set up and functioning as intended in each locomotive, whether lead or remote. It also would be desirable to verify locomotive distributed power operation and to test repeaters without having to use a second locomotive.

BRIEF SUMMARY OF THE INVENTION

An exemplary embodiment relates to a train control system configured to control at least two locomotives. The train control system includes a control unit on each locomotive and is configured to control the locomotives using communication links between the control units. An embodiment of a method for testing the control system includes establishing communication between a testing device and a first locomotive control unit, and emulating a second locomotive control unit using the testing device. A system for testing such a train control system includes a processor linked to the testing device and configured to perform at least one control unit testing procedure.

The above described method and system allow testing to be performed using a hand-held testing device in place of a second locomotive. The above-described testing device also facilitates testing of repeaters.

DETAILED DESCRIPTION OF THE INVENTION

Figure 1:
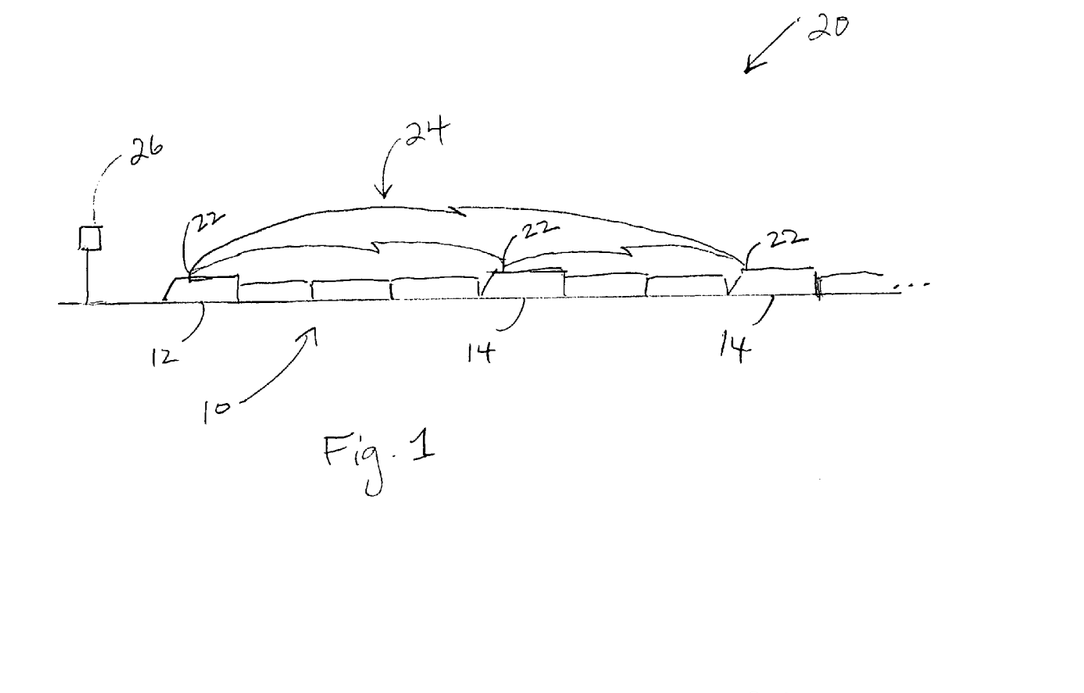
FIG. 1 is a diagram of a train and an associated train control system.

FIG. 1 illustrates a train 10 including a lead locomotive 12 and at least one remote locomotive 14. Train 10 is equipped for control by a train control system 20, for example, a LOCOTROL® distributed power (DP) system from GE Harris Railway Electronics, LLC, Melbourne, Fla. Train control system 20 includes a control unit 22 located in lead locomotive 12 and configured under control system 20 as a lead locomotive unit. Additional control units 22 of control system 20 are located respectively in remote locomotives 14 and are configured under control system 20 as remote units.

Control system 20 controls locomotives 12 and 14, e.g. via command signals sensed at lead locomotive 12 and transmitted over radio communication links 24 to remote locomotives 14. Control system 20 includes one or more repeaters 26 that receive, store and selectively retransmit messages, e.g. to bolster communication in areas such as tunnels. Control system 20 also interfaces with an air brake system (not shown) of train 10 and provides for control of train 10 motive power and braking.

Figure 2:
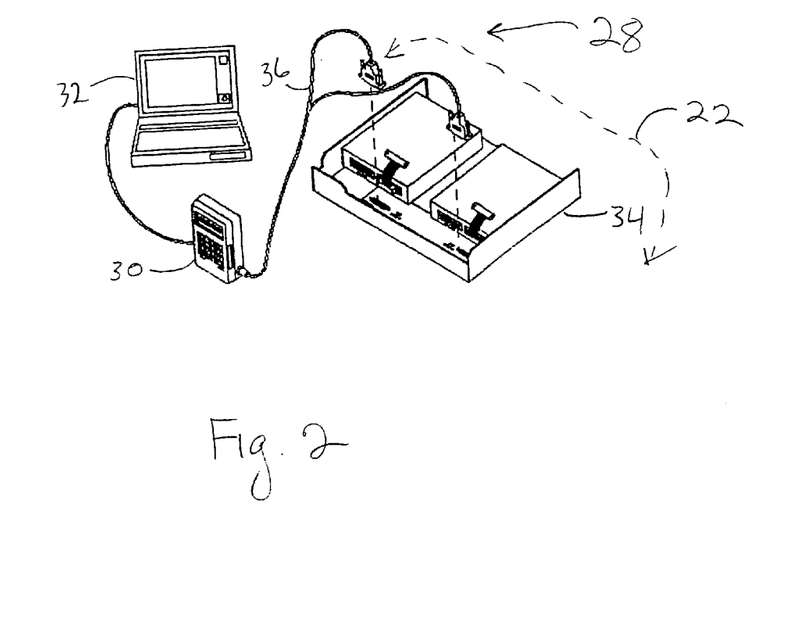
FIG. 2 is an illustration of a train control testing system.

One embodiment of a method for testing train control system 20 includes establishing communication between a testing device (not shown in FIG. 1 and further described below) and one of locomotive control units 22, and emulating another of locomotive control units 22 using the testing device. For example, FIG. 2 illustrates one embodiment of a system 28 for testing train control system 20. Referring to FIG. 2, communication is established between a communication test device (CTD) 30 and a processor, e.g. a laptop computer (PC) 32, as further described below, a Palm Pilot type handheld computer, or a computing device. CTD 30 is linked to a radio module 34 of control unit 22 via a baseband connection using e.g. a radio bypass cable 36.

Figure 3:
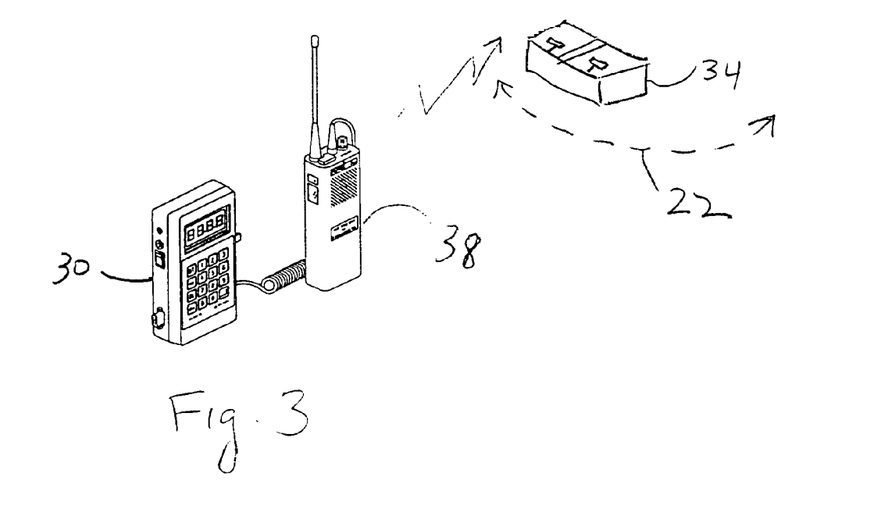
FIG. 3 is an illustration of a train control testing system.

In an alternative embodiment and as shown in FIG. 3, CTD 30 is operatively coupled or linked to radio module 34 of control unit 22 for example via a portable radio 38. As further described below, testing system 28 uses portable radio 38 for linking to a locomotive 12 or 14 or to a message repeater 26 and for testing a radio module 34 on a locomotive or testing a locomotive as a lead. All other system 28 tests are configured to be performed at baseband using, e.g. a wired connection as shown in FIG. 2. Thus tests which otherwise might permit use of CTD 30 as a remote controller are performed by a test engineer located on board a locomotive under test.

Testing system 28 sends and receives messages, via CTD 30, to at least one of control system 20—equipped locomotives 12 and 14. Testing system 28 verifies that control system 20 equipment is set up and functioning as expected when a locomotive control unit 22 is set up as a lead or as a remote unit. System 28 monitors and records communications between locomotives 12 and 14. System 28 also tests message repeater(s) 26 and monitors message repeater 26 communications.

Testing system 28 uses software in PC 32 for verifying system 20 distributed power equipment and monitoring real time communications. PC 32 is not used in one embodiment for message repeater 26 testing or recording communication sessions as further described below.

System 28 executes test files or scripts (not shown) from PC 32 designed to perform commissioning procedures and specific troubleshooting tests on a locomotive 12 or 14. A locomotive 12 or 14 is tested as a lead or a remote unit. Testing a locomotive 12 or 14 as a remote unit exercises a majority of the locomotive system 20 DP hardware. Other hardware tests are performed with a locomotive 12 or 14 set up as a lead unit. The test scripts are determined or configured for each specific locomotive set up.

System 28 provides several tests, including a commissioning test and shorter function-specific tests. The commissioning test typically is used to qualify a unit 22 for DP service after a release from a repair shop, for periodic, e.g., 92-day inspections, and the like. A function-specific test is used to "exercise" an affected function to identify or confirm reported defects and as an aid to rapid troubleshooting and repair.

A test script typically determines whether a test locomotive is set up as a lead unit or as a remote unit. The script also determines what type of locomotive the test is for and whether the test is to be for commissioning or for troubleshooting specific parts of equipment under system 20 control.

System 28 performs a function test organized into logical sections that follow a standard sequence of events, e.g. to satisfy DP system interlocks, or in one embodiment to maximize process efficiency. The function test includes the following sections:

1. Setup—Provides prompts for a test operator to configure a unit 22 for DP testing.

2. Link Test—CTD 30 Links with unit 22 under test and passes parameters such as brake valve status setting, DP type, and AC/DC type. Verifies DP type and AC/DC type and checks for system 20 fail and system 20 warning events. Verifies radio 34 swap functionality.

3. Brake pipe Test—Recovers DP emergency or penalty, cuts in a locomotive brake valve, and charges a brake pipe prior to running a brake pipe continuity test. Checks status of brake valve, emergency, penalty, system 20 faults, and engine run. Verifies whether brake pipe pressure is within expected limits.

4. Throttle Tests—Checks locomotive throttle sequences and direction. Verifies each throttle step.

5. Dynamic Brake Tests—Checks dynamic brake settings. Verifies whether dynamic brake step voltages are within expected limits.

6. Tractive effort tests—Sets full engine brakes. Instructs operator to put unit 22 online. Commands direction and throttle. Verifies development of tractive effort within expected limits. Instructs operator to take unit 22 off line.

7. Alarm Tests—Instructs the operator to apply alarm events to unit 22 under test. The alarm events are verified.

8. Sanding Tests—Commands sanding in forward and reverse directions. Verifies that a sanding train-line is energized. The operator is instructed to visually verify sanding for each direction.

9. Automatic Brake Tests—Commands a sequence of automatic brake reductions to set values. Verifies that locomotive equalizing reservoir and brake pipe pressures are within expected limits for each reduction. Checks for suppression of a brakepipe-pressure-less-than-45 psi-emergency when there is no direction and locomotive brakes are applied. Also verifies that brake cylinder pressure developed from an automatic application is within expected limits.

10. Automatic Bail Test—Commands an automatic bail. Verifies brake cylinder pressure has released.

11. Unexpected Flow Test—Prompts the operator to open a flow valve on a flow valve hose assembly as further described below. Verifies detection of an unexpected flow event. Verifies that flow rate reading is within expected limits.

12. Independent Brake Tests—Commands a sequence of independent brake applications to set values. Verifies whether brake cylinder pressures are within expected limits for each application.

13. Emergency Brake Tests—Prompts the operator to initiate a conductor's valve emergency and an automatic handle emergency. Commands a radio emergency, as well as a low brake pipe emergency. Verifies emergency status and that equalizing reservoir, brake pipe and brake cylinder pressures are within expected limits. Verifies power control trip, brake valve cut-out, and throttle drop to idle. Recovers the emergency at the end of each sequence.

14. Communication Override Test—After throttle setup the script file causes a 45-second loss of communication to simulate a system 20 communication loss. The operator is then prompted to open a test flow valve (further described below) to create an unexpected flow. The system then verifies reduction to idle and brake valve cut-out.

15. Unlink Test—Unlinks from control unit 22 and provides an exit point for a completed test.

Figure 4:
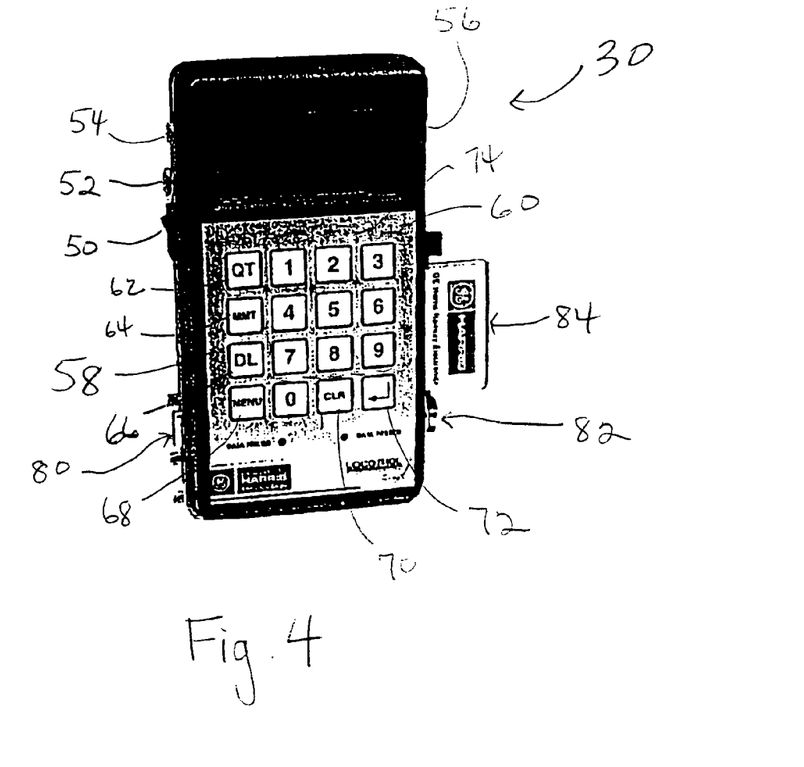
FIG. 4 is a diagram of a communication testing device.

FIG. 4 is an illustration of one embodiment of CTD 30. CDT 30 is configured to be hand-held by an operator. Testing device 30 includes an on-off switch 50, a power input port 52, an auxiliary input port 54, and a display panel 56. Panel 56 includes green and red LEDs (not shown). Testing device 30 also includes a keypad 58 including a plurality of keys 60. Keys 60 are further described below and include a QT key 62, an MMT key 64, a DL key 66, a MENU key 68, a CLR key 70, an ENTER key 72, and numeric (0 through 9) keys 74: CTD 30 also includes an EIA RS 232 PC port 80, a radio port 82, and a data logging PCMCIA memory card 84.

Communication testing device (CTD) 30 is powered in one embodiment by a battery (not shown), in another embodiment using an AC adapter (not shown), in yet another embodiment using a 12-volt DC car adapter (not shown), and in still another embodiment by a battery (not shown) in portable radio 38 (shown in FIG. 3). In one embodiment a power source selection switch (not shown) is used to select one of the above-described power sources. When powered up, display panel 56 indicates operational readiness by displaying a current version number for system 28 software.

An operator controls CTD 30 using keypad 58. A key 60 in one embodiment provides more than one level of function selection. A selection is made by pressing a selected key 60 until a desired function is displayed on display panel 56, then pressing ENTER key 72. Key functions are shown in Table 1 and are further described below.

TABLE 1

| Key Name | Key Label | Key Function |
|---|---|---|
| Quick Test | QT | Performs a quick test of a message repeater. |
| Multi-Message Test | MMT | Performs a multi-message test of a message repeater. |

TABLE 1-continued

| Key Name | Key Label | Key Function |
| --- | --- | --- |
| Data Log | DL | Enables/Disables data recording to the Data Logging Card. |
| Menu | MENU | Provides CTD menu functions. |
| Clear | CLR | Aborts any selected function, clears CTD display. |
| Enter | | Executes selected function or completes data entry. |
| Numeric Keys | 0 to 9 | Used to input numeric values. |

CTD 30 performs functional testing on message repeater 26 by transmitting an operator-selected lead locomotive 12 message and verifying that the message is repeated by message repeater 26. In one embodiment three types of control system 20 messages are available for testing: a link message, a help message and a no-help message. Link and help messages should always be repeated by message repeater 26. A no-help message is required by control system 20 to be received but not repeated by message repeater 26. A yellow active indicator (not shown) on message repeater 26 is illuminated when it is repeating messages for one or more trains. The above described control system 20 messages transmitted by CTD 30 are configured to test message repeater 26 without interfering with valid system 20 intratrain communications.

During message testing for example, the green LED on CTD 30 display panel 56 is illuminated each time a message is accurately received by CTD 30 from message repeater 26. CTD 30 checks each byte of a message for correct Barker codes, message length, message content, and vertical parity. If a corrupted message is received by CTD 30, the red LED is illuminated. No LEDs and/or an LCD display are illuminated if no message is received from message repeater 26. When a message test is completed, CTD 30 displays a percentage of correctly repeated messages. If one link message was sent and one was repeated by message repeater 26, CTD 30 displays "100". If no messages were repeated then "0" is displayed.

An operator uses CTD 30 keys 60 to specify a plurality of functions, including the following described functions. A Quick Test function transmits one test message to message repeater 26 and then displays a percentage of correctly repeated messages. If the message is repeated then "100" is displayed; if the message is not repeated, then "0" is displayed. Quick Test is enabled by pressing QT key 62. CTD 30 displays "LI", meaning the link message will be transmitted. If QT key 62 is pressed again, "HLP" is displayed, meaning the help command will be transmitted. If QT key 62 is pressed again, "–HLP" is displayed for No Help messages. Each time QT key 62 is pressed, CTD 30 cycles to a next message type. The displayed message type is transmitted and Quick Test is executed when ENTER key 72 is pressed.

A Multi-Message Test function sends an operator-selected message type from one to 9999 times, checks for message repeater 26 response for each message sent, and displays a percentage of correctly repeated messages. Multi-Message Test is performed in the same manner described above for Quick Test, but the operator defines how many messages are transmitted. To execute Multi-Message Test, the operator presses MMT key 64 until the desired message type is displayed ("LI", "HLP", or "–HLP") and presses ENTER key 72. CTD 30 displays "100", a default number of messages to be sent. The default value is selected by pressing ENTER 72, or a new value is entered by using numeric keys 74 to key in a value from one to 9999 and then pressing ENTER 72. CTD 30 display panel 56 counts down as each message is transmitted and the red and green LEDs indicate whether the message was repeated by message repeater 26. CTD 30 delays approximately two seconds between each transmission. A percentage of accurately repeated messages is displayed after a last test message is transmitted.

A Data Logging function records radio-frequency communication data to data logging card 84. The data is viewed and/or saved to PC 32 when data logging is complete. Data logging execution begins by pressing DL key 66.

CTD 30 prompts the operator to select filtered or unfiltered data logging. When filtered data logging is selected, complete and valid control system 20 radio messages are recorded. Each message is time-stamped with 10-hertz time. When unfiltered data logging is selected, every radio data byte received is recorded, including complete messages, corrupt messages, and radio noise. Each block of 64 bytes of raw radio data is time stamped with 10-hertz time. CTD 30 display 56 cycles between "FIL" and "–FIL" each time DL key 66 is pressed until ENTER key 72 is pressed to make a selection. CTD 30 then displays "dLOG" to indicate that data logging is in progress. When data has been recorded for a desired time period, DL key 66 is pressed to complete data logging. Each data logging session creates a new file on data logging card 84.

A Menu function is used to change various CTD 30 control settings and provides several functions in addition to those included on CTD keypad 58. Each time MENU key 68 is pressed, CTD display 56 cycles through available menu selections until a selection is made by pressing ENTER key 72. Some menu items contain sub-menus (not shown) which are cycled by pressing MENU key 68 and selected by pressing ENTER key 72. Menu item selection is aborted by pressing CLR (clear) key 70. Menu items are listed by menu order in Table 2 and are further described below.

TABLE 2

| Menu Display | Function | Inputs |
| --- | --- | --- |
| HOUr | Set CTD time | Numeric hour (0–23), minute, second |
| dAtE | Set CTD date | Numeric year (0–99), month, day |
| Unl | Set CTD radio channel by unit number | last digit of locomotive unit number, numeric 0–9 |
| CHA | Set CTD radio channel | Numeric radio channel, 1–4 |
| SELF | Perform CTD Self Test | none, Enter to enable |
| PC | Connect to PC | none, Enter to enable |
| SEL | select radio or auxiliary input | use MENU key to select between rAdO and AUL |
| Card | display data logging card available memory | none, MUST have inserted data logging card before power-up |
| ErAS | erase data logging card | none, MUST have inserted data logging card before power-up |
| dELA | set CTD transmitter keying delay time | Numeric 0 to 990 milliseconds in 10 ms. Increments |

A CTD 30 time value is used to time-stamp radio-frequency data during data logging and PC 32 data recording as further described below. CTD 30 time is set by pressing MENU key 68 until "HOUr" is displayed and pressing ENTER key 72. An hour, minute and then second are entered in sequence.

A CTD 30 date value is used to date-stamp files created during data logging and PC 32 recording operations as further described below. CTD 30 date is set by pressing MENU key 68 until "dAtE" is displayed and pressing ENTER key 72. A date is entered in the same manner as CTD 30 time.

A Set Unit Number function is used to set a radio channel associated with a last digit of a control unit 22 unit number. Unit number is set by pressing MENU 68 until "Unlt" is displayed, followed by pressing ENTER key 72. A default value is displayed. The default value is accepted by pressing ENTER key 72, or a last unit number digit from 0–9 is keyed in followed by ENTER 72. Unit numbers and corresponding radio channel settings are shown in Table 3. If a radio channel has previously been set with Set Radio Channel function described below, then no default unit number is displayed since multiple unit numbers correspond to each of four radio channels.

TABLE 3

| Last Digit of Unit Number | Radio Channel |
| --- | --- |
| 0 | 4 |
| 1 | 3 |
| 2 | 2 |
| 3 | 1 |
| 4 | 4 |
| 5 | 3 |
| 6 | 2 |
| 7 | 1 |
| 8 | 4 |
| 9 | 3 |

A Set Radio Channel function is used to set the radio channel. Actual radio frequencies are determined by radio program data. Radio Channel is set by pressing MENU 68 until "CHA" is displayed, followed by ENTER key 72. A default value displayed is accepted by pressing ENTER 72, or a radio channel number from 1 through 4 is keyed in followed by ENTER 72. A list of channel numbers and associated frequencies is shown in Table 4.

TABLE 4

| Channel | Frequency |
| --- | --- |
| 1 | 452.925 MHz |
| 2 | 452.950 MHz |
| 3 | 457.925 MHz |
| 4 | 457.950 MHz |

A CTD Self Test function tests an internal modem (not shown), RS-232 port 80, the LEDs, and control panel display 56. Self Test is enabled by pressing MENU key 68 until "SELF" is displayed and then pressing ENTER 72. The red and green LEDs flash during the test and CTD 30 displays "PASS" or "FAIL" when Self Test is complete.

A PC Mode function is used to establish communication between CTD 30 and PC 32 for executing commissioning and/or troubleshooting procedures. To enable communication, CTD 30 PC port 80 first is connected to a PC 32 COM port (not shown) via, e.g. a 9-pin RS-232 cable. System 28 software is configured to execute from PC 32. When PC 32 displays "Waiting for CTD input . . . ", PC Mode is enabled by pressing MENU key 68 until "PC" is displayed and ENTER 72 is pressed. Once communication is established, CTD 30 functions and controls are executed from PC 32 as further described below. Pressing CLR key 70 disables PC Mode from CTD 30.

A Select Input function allows radio port 82 (a default) or auxiliary port 54 to be selected as a data input source. Radio output is always active. To change an active input source, MENU key 68 is pressed until "SEL" is displayed and then ENTER 72 is pressed. CTD 30 then cycles between "rAdO" (radio) and "AUL" (auxiliary) each time MENU key 68 is pressed until a selection is made by pressing ENTER 72. Only one input is active at a time. Auxiliary input 54 is used e.g. to receive TTL-level signal data typically used to troubleshoot message repeater 26 Comm PC boards (not shown).

A Card Status function displays a percentage of available recording memory remaining on data logging card 84. MENU key 68 is pressed until "Card" is displayed on CTD 30. When ENTER key 72 is pressed, if card 84 data files have been corrupted, the Card Status function causes card 84 to be erased. Otherwise, a percentage of available data logging memory is displayed as a value from zero to 99.

An Erase function is used to delete all radio data logging files from card 84. Erase is selected by pressing MENU key 68 until "ErAS" is displayed. When ENTER 72 is pressed, display 56 begins to flash, awaiting confirmation of an impending erase operation. ENTER 72 is pressed to proceed with an erase operation or CLR 70 is entered to abort the function. CTD 30 performs an erase automatically if corrupted data files are detected during Data Logging or Card Status operations. In one embodiment the Erase operation takes approximately 8 minutes for a four megabyte PCM-CIA card.

A transmitter key delay time is an amount of time, in 10 millisecond increments, between keying a control system 20 transmitter and transmitting radio message data. A Set Transmitter Key Delay Time function assists in troubleshooting a control system having a faulty radio. With an extended delay time, the radio may power up and transmit more reliably. A key delay time is entered in 10 millisecond increments. To change transmitter key delay time, MENU 68 is pressed until "dELA" is displayed; then Enter 72 is pressed. A default time is displayed. A desired time from 0 to 990 milliseconds then can be entered.

To set up testing system 28, the following procedures are followed in one embodiment. A locomotive 12 or 14 ("test locomotive") is uncoupled and brake pipe angle cocks are closed on both ends. Test locomotive handbrakes are applied. A test locomotive multiple-unit cable and other air hoses are not connected. A test locomotive isolation switch is set to an ISOLATE position and it is ensured that the test locomotive is clear of electrical control ground faults. CTD 30 is powered up and connected to radio 34 or 38, depending on a type of test to be performed.

Figure 5:
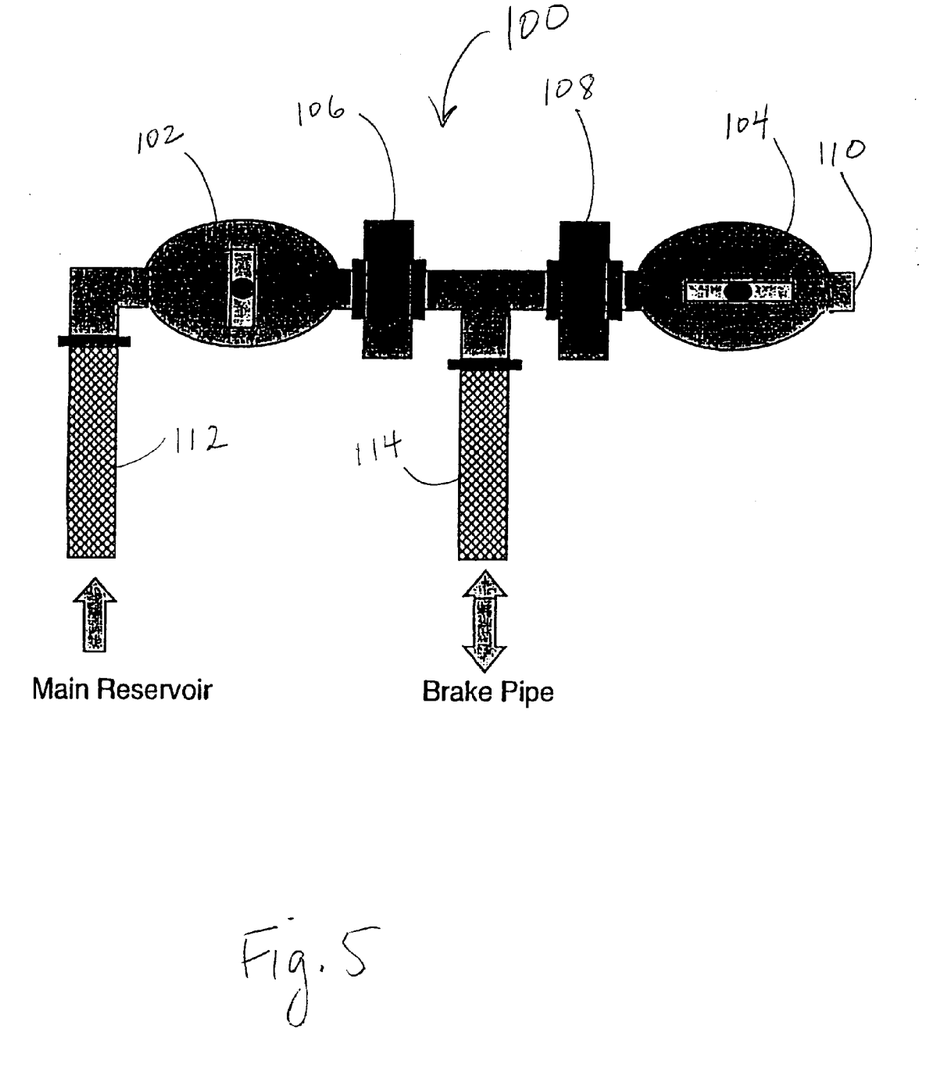
FIG. 5 is a diagram of an air flow valve assembly.

FIG. 5 illustrates an air flow valve assembly (AFVA) 100 including valves 102 and 104, orifices 106 and 108, a vent 110 and hoses 112 and 114. AFVA 100 is used to generate a pressure rise in the test locomotive brake pipe. AFVA 100 is also used in an air flow sensor test to create a brake pipe leakage at a specific rate. This rate is reported by testing system 28 in PSID (pounds per square inch, differential). Since air flow rate is influenced by air temperature and atmospheric pressure, system 28 uses air flow rate tables (not shown) which present the flow rate (PSID) as a function of atmospheric pressure (PSIA) or "feet above sea level" and temperature. System 28 compares a table flow rate value with an actual value on display 56.

AFVA 100 is set up in one embodiment, e.g. on a locomotive (not shown) equipped with electronic air brake equipment, as follows. A side of the locomotive air brake compartment is lowered. Both valves 102 and 104 are closed. Hose 112 is connected to a locomotive main reservoir access port and hose 114 is connected to a locomotive brake pipe access port.

As previously described, testing system 28 software performs CTD 30 support and message display functions. Testing system 28 software is installed on PC 32 as is known in the art. When program installation is complete, a configuration procedure is executed which creates a data file to customize testing system 28 for a specified railroad. When communication between CTD 30 and PC 32 is established as described above, test procedures then are selected and executed. Test results in one embodiment are saved to a disk in ASCII text format.

Testing system 28 displays system messages, including, e.g. Remote Mode and Throttle Control for each remote, general commands, and dynamic brake control information. Status message displays include throttle status, analog data values, locomotive alarms, and system events. Two PC 32 screen windows (not shown) are used to separate directly transmitted messages from repeated messages. Radio messages are also displayed and recorded to a hard disk in real time as they are received by CTD 30. Each message is time stamped with hour, minute, second, and tenth of a second.

CTD 30 also is operable from PC 32. Any function provided by CTD keypad 58 can be executed from PC 32 after system 28 has entered PC Mode as described above. Radio log operations allow the operator to read from or record to data logging card 84. Available functions in one embodiment include the following functions.

When a Log File Summary function is invoked, system 28 causes CTD 30 to read card 84 and send a summary of each file recorded to PC 32. PC 32 displays a file number, date, start and stop recording time, log type and length. The operator is prompted to continue/complete the summary or to enter a file number to read and display the contents of a file.

A Read Radio Log File function causes CTD 30 to read contents of a selected file from card 84 and send the data to PC 32 for display. System 28 determines the file type (raw or message data) and displays all data in the file accordingly. System 28 prompts whether the file data should be saved to disk. Thus recorded data can be viewed and analyzed when CTD 30 is not available to read card 84.

A Record Radio Messages function causes CTD 30 to begin recording radio message data to card 84. The same function is performed outside PC Mode by selecting Filtered Data Logging from CTD keypad 58 as previously described.

A Record Raw RadioData function causes CTD 30 to begin recording raw radio data to card 84. The same function is performed outside PC Mode by selecting Unfiltered Data Logging from CTD keypad 58 as previously described.

An Erase Radio Log Files function causes CTD 30 to erase all data logging files from card 84. This operation in one embodiment takes approximately 8 minutes.

A Radio Message Operations function causes CTD 30 to perform the Multi-Message or Quick Test functions as done through CTD keypad 58. Additionally, in one embodiment radio messages are decoded and displayed by PC 32 as they are received in real time by CTD 30. The upper PC screen window displays CTD date, parity, frame or overrun errors detected by CTD 30 during message reception. The upper PC window displays directly transmitted messages while the lower PC window displays repeated messages.

In one embodiment CTD 30 and portable radio 38 are used to test a repeater 26, without PC control, in the following manner. Link and help messages are sent via CTD 30, radio 38 and repeater 26, and a repeater 26 response is verified, on each system 20 frequency. No-help messages are sent in the same manner, and it is verified that repeater 26 does not respond, on each system 20 frequency.

Repeater 26 radio equipment (not shown) also is checked using CTD 30 and portable radio 38 in the following manner. Forward and reflected RF power are checked using a wattmeter. Repeater 26 transmitter frequencies and deviation are checked using attenuators (not shown). CTD 30 and radio 38 are used to verify that each repeater 26 receiver responds as expected, and repeater 26 RF receive signal levels may be adjusted accordingly.

CTD 30 also is used in one embodiment to test repeater 26 antennas (not shown) as follows. A mobile radio, e.g. a Spectra mobile 30-watt radio with an outside magnet-mount ¼-wave whip antenna, is used with CTD 30 in a rail vehicle (not shown) over a test distance including, e.g. a tunnel. CTD 30 is set to transmit e.g. 100 link messages depending on the distance over which testing is to be conducted. While the vehicle moves at a fixed speed, CTD 30 sends link messages. Antennas are evaluated based on number and quallity of response messages received over the distance.

To check a tunnel for a suspected bad section of leaky coaxial cable or a bad RF amplifier, CTD 30 is used in one embodiment with portable low powered radio 38 to run RF link messages. A low-powered radio 38 with a small antenna will not mask a trouble area and is likely to help isolate a trouble area by indicating corrupted or failed messages. Of course, CTD 30 is used in many other troubleshooting applications not specifically described herein.

The above described method and system allow control system testing to be performed using a convenient hand-held testing device in place of a second locomotive. The above-described testing device also facilitates testing of repeaters and is easily connected to a PC to perform commissioning and other testing.

While the invention has been described in terms of various specific embodiments, those skilled in the art will recognize that the invention can be practiced with modification within the spirit and scope of the claims.

What is claimed is:

1. A method for testing a distributed electrical power control system for controlling locomotive power to move a train having a first locomotive and at least one second locomotive, the power control system including a train control system comprising a first control unit on the first locomotive configured to control power generated on the first locomotive, a second control unit on a second locomotive to control power generated on a second locomotive respective, the first and second control units establishing a communication link to communicate power control messages between the first and second control units, the first control unit further being configured to communicate with a distributed electrical power control system testing device independent of its communication with a second control unit to enable testing of the first unit without use of a second control unit, said method for testing comprising:
providing a testing device that emulates the operation of a second control unit but that is not carried on a second locomotive to control power generated onboard the second locomotive;
establishing a communication link between the testing device and the first locomotive control unit that emulates the communication link that would exist between the first control unit and a second control unit;
executing preprogrammed test scripts to test the distributed power control system without communicating between the first control unit and a second control unit and without controlling the generation of power on a second locomotive; and using the testing device to emulate the operations and communications of a second control unit relative to the first control unit.

2. A method in accordance with claim 1 wherein said step of establishing communication between the testing device and the first control unit comprises providing for base-band communication between the testing device and the first control unit.

3. A method in accordance with claim 1 wherein said step of establishing communication between the testing device and the first control unit comprises providing for wireless communication between the testing device and the first control unit.

4. A method in accordance with claim 1 wherein the train control system includes at least one message repeater, said method further comprising the step of establishing radio communication between the testing device and the repeater.

5. A method in accordance with claim 4 further comprising the step of testing a repeater antenna over a distance using the testing device.

6. A method in accordance with claim 1 wherein the first control unit is operable in the role of either a lead or a remote control unit relative to the testing device, and the method further comprises selecting the role in which the first control unit is to operate during testing.

7. A method in accordance with claim 6 wherein emulating a second locomotive control unit comprises:
if the first control unit is selected to operate as a lead unit:
receiving control messages at the testing device from the control unit; and
responding to the received messages in accordance with the executing test script;
if the control unit is selected to operate as a remote unit:
sending control messages from the testing device to the first control unit;
receiving responses to the sent messages from the first control unit; and
verifying the responses are in accordance with the executing test script.

8. A method in accordance with claim 1 wherein said step of emulating a second locomotive control unit comprises the steps of:
establishing communication between the testing device and a processor; and
executing preprogrammed testing scripts, that include testing instructions and testing commands, using the processor.

9. A method in accordance with claim 8 wherein said step of establishing communication between the testing device and a processor comprises establishing communication with a personal computer.

10. A method in accordance with claim 8 further comprising the step of changing a locomotive brake pipe pressure using an air flow valve assembly.

11. A method in accordance with claim 8 further comprising the step of testing an air flow sensor using a rate of the brake pipe pressure change.

12. A method in accordance with claim 8 further comprising the step of testing locomotive functioning using the processor.

13. A method in accordance with claim 1 further comprising the step of recording communications using the testing device.

14. A testing system for testing a selected locomotive distributed power control system for controlling locomotive power to move a train having at least two locomotives the power control system including a train control system comprising:
a first control unit on a first locomotive to control power generation on the first locomotive, the first control unit beings configured to communicate with a second control units on a second locomotive adapted to control power generation on the second locomotive, the first control unit being configured to selectively operate in the role of a lead unit or a remote unit, said testing system comprising:
a testing device configured to emulate the operation of a second control unit but not carried on a second locomotive and not controlling power generation on the second locomotive;
a transmitter and a receiver for linking communications between the first control unit on the selected locomotive and said testing device to communicate control messages between the first control unit and the testing device, without communicating control messages with a second control unit; and
a processor configured to link to said testing device for testing the locomotive distributed power control system without communicating with a second control unit, said processor configured to execute testing scripts stored in a memory of said processor.

15. A testing system in accordance with claim 14 wherein the first control unit being configured to selectively operate in the role of a lead unit or a remote unit relative to the testing device.

16. A testing system in accordance with claim 15 wherein if the control unit is selected to operate as a remote unit, said testing device configured to:
send a testing control message to the first control unit;
receive responses to the sent message from the first control unit; and
verifying the responses are in accordance with a test script executing on said processor.

17. A testing system in accordance with claim 15 wherein if the control unit is selected to operate as a lead unit, said testing device configured to:
receive a testing control message from the first control unit; and
respond to the received message in accordance with a test script executing on said processor.

18. A testing system in accordance with claim 14 further comprising a radio linking said testing device to the control unit.

19. A testing system in accordance with claim 14 further comprising a radio bypass cable linking said testing device to the control unit.

20. A testing system in accordance with claim 14 wherein said processor is configured to execute at least one locomotive distributed power control system testing script.

21. A testing system in accordance with claim 14 wherein said at least one locomotive distributed power control system testing script comprises a function-specific test including at least one of a communications link test, a brake pipe test, a throttle test, a dynamic brake test, a tractive effort test, an alarm test, a sanding test, an automatic brake test, an automatic bail test, an unexpected flow test, an independent brake test, an emergency brake test, a communication override test and an unlink test.

22. A testing system in accordance with claim 14 wherein said testing device comprises a memory device, said testing device further configured to record communication data on said memory device.

23. A testing system in accordance with claim 22 wherein said processor configured to display communication data from said memory device.

24. A device for testing a distributed electrical power control system for controlling locomotive power to move a train having a first locomotive and at least one second locomotive, the power control system including a train control system comprising a first control unit on the first locomotive configured to control power generated on the first locomotive, a second control unit on a second locomotive to control power generated on a second locomotive, the first and second control units establishing a communication link to communicate power control messages between the first and second control units, the testing device comprising:

- a transmitter and a receiver for linking communications between the first control unit on the selected locomotive and said testing device to communicate control messages between the first control unit and the testing device, without communicating control messages with a second control unit; and
- a processing unit configured to enable the testing device to emulate the operation of a second control unit but without being carried on a second locomotive and without controlling power generation on a second locomotive.

25. A testing device in accordance with claim 24 wherein the testing device is configured to be selectively operable in the role of either a lead or a remote control unit relative to a first control unit.

26. A testing device in accordance with claim 25 wherein when the control unit is to configured to communicate as a lead locomotive, said testing device is configured to emulate a control unit that is configured to communicate as a remote control unit.

27. A testing device in accordance with claim 24 wherein when the control unit is to configured to communicate as a remote locomotive, said testing device is configured to emulate a control unit that is configured to communicate as a lead control unit.

28. A testing device in accordance with claim 24 further comprising a data logging device configured to receive and store communication data.

29. A testing device in accordance with claim 24 configured to communicate with the locomotive control unit through a base-band communication link.

30. A testing device in accordance with claim 24 configured to communicate with the locomotive control unit through a wireless communication link.

31. A testing device in accordance with claim 24 wherein the train control system includes at least one message repeater, said testing device configured to communicate with the repeater.

32. A testing device in accordance with claim 31 further configured to test a repeater antenna over a distance using the testing device.

* * * * *